Aug. 19, 1930.   C. ROBERTS   1,773,377
MANUFACTURE OF RUBBER TREADS FOR FOOTWEAR
Filed March 10, 1926   2 Sheets-Sheet 1
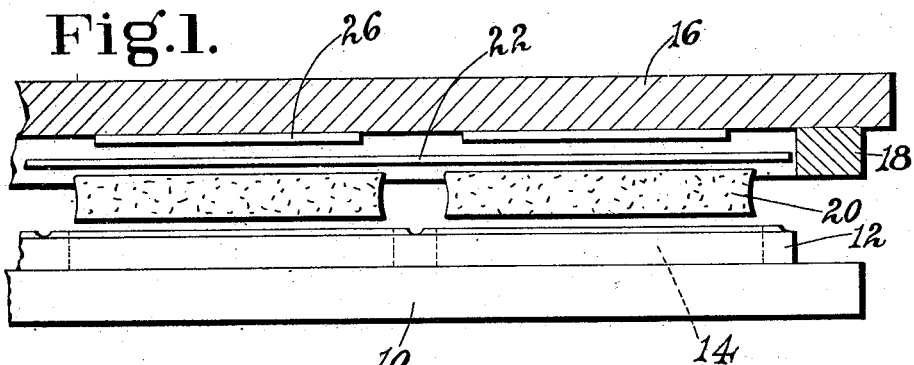
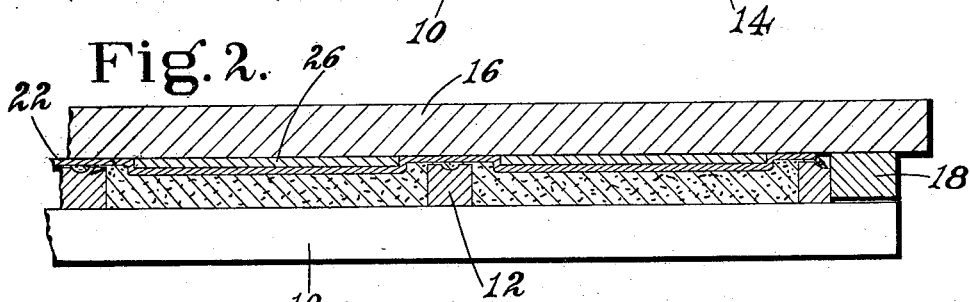
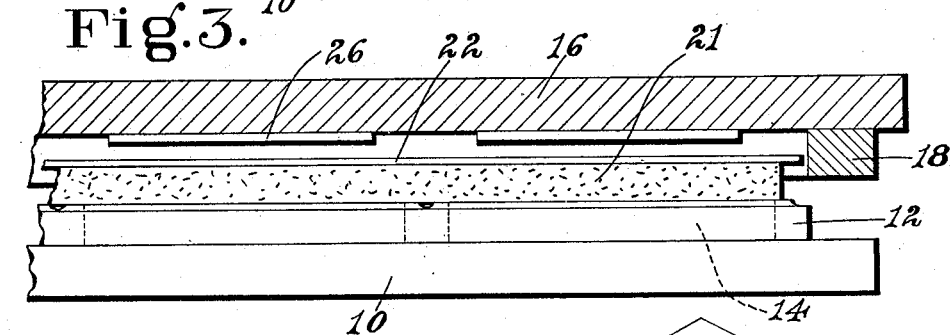
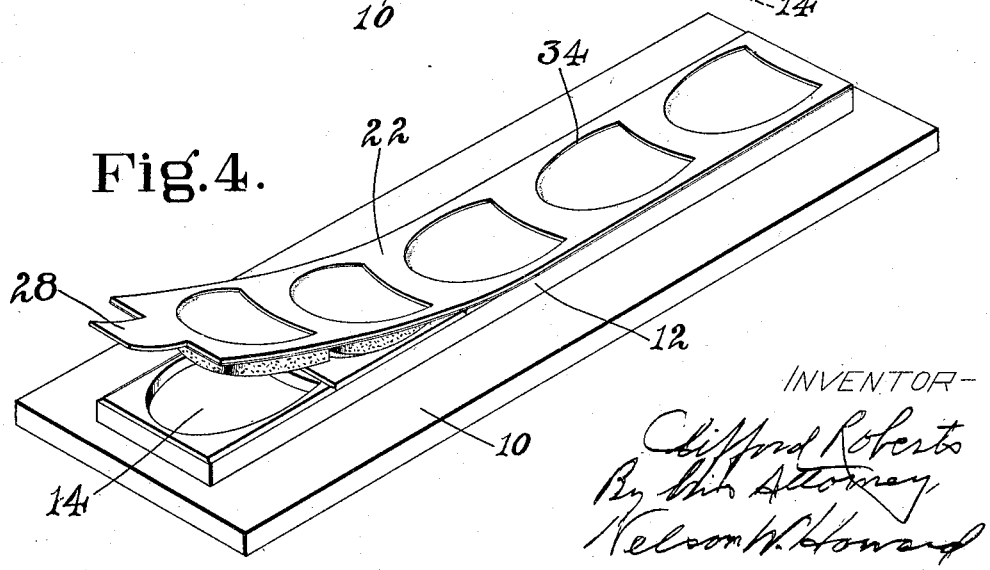

Aug. 19, 1930.  C. ROBERTS  1,773,377
MANUFACTURE OF RUBBER TREADS FOR FOOTWEAR
Filed March 10, 1926   2 Sheets-Sheet 2
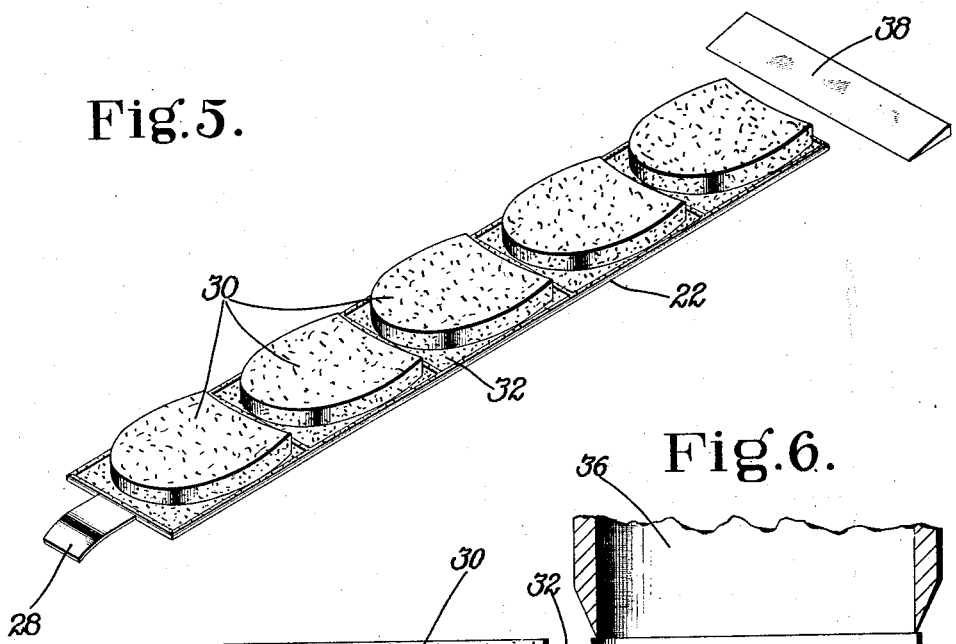
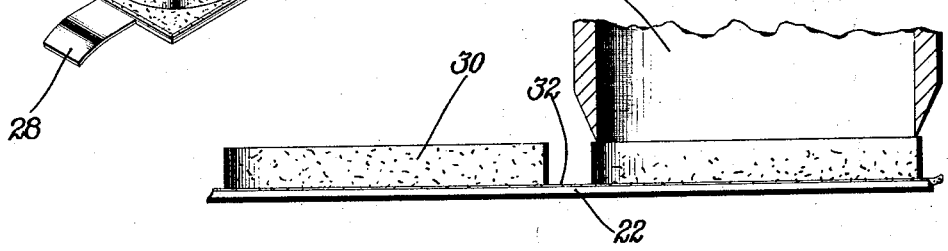
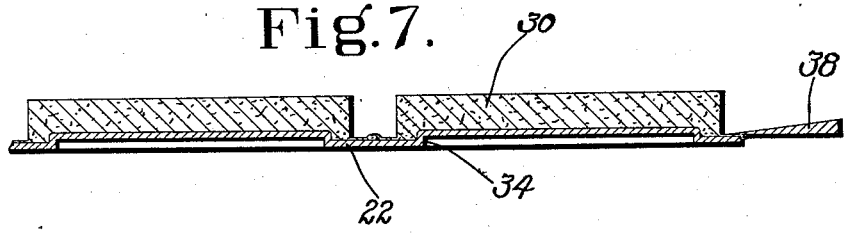
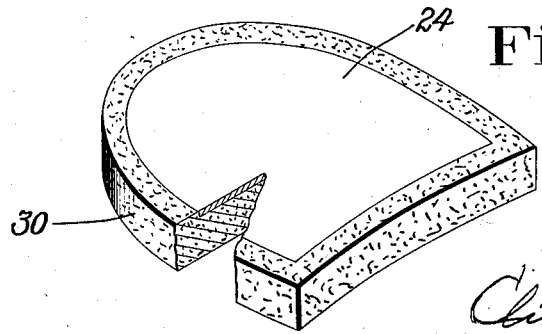
INVENTOR-
Clifford Roberts
By his Attorney
Nelson W. Howard Patented Aug. 19, 1930

1,773,377

UNITED STATES PATENT OFFICE

CLIFFORD ROBERTS, OF WINCHESTER, MASSACHUSETTS, ASSIGNOR TO UNITED SHOE MACHINERY CORPORATION, OF PATERSON, NEW JERSEY, A CORPORATION OF NEW JERSEY

MANUFACTURE OF RUBBER TREADS FOR FOOTWEAR

Application filed March 10, 1926. Serial No. 93,811.

This invention relates to the manufacture of rubber treads for footwear and has for an object the provision of an improved method of making rubber heels and soles which shall effect conspicuous economies in manufacturing cost, as compared with the methods heretofore used, and shall produce heels of greater uniformity in size than is the rule at the present time.

In its broadest aspect the method of the present invention is applicable to the manufacture of molded tread members of various classes, including, for example, whole heels, half heels, heel sections, and heel lifts of various descriptions; and is adaptable to the production of different types of such heels, among which may be mentioned washer heels, cored heels, and backed heels, by which is meant, respectively, heels having nail anchoring washers embedded therein, heels having cores of relatively firm material which do not extend to the edges of the heels, and heels having backing layers of relatively firm material which do extend to the edges of the heels.

In one aspect, my novel method comprises molding simultaneously, either from a plurality of separate biscuits or from a single piece or mass of rubber compound, a plurality of individual heel or sole bodies connected together by a relatively thin sheet or web of material and then slicing the bodies from the web. The connecting web may consist of a single, integral sheet of backing material, upon which the individual rubber heel bodies are molded. The heels may be separated from each other, and from the connecting web, by cutting in a plane parallel to the web.

My improved method accords important advantages over the formerly established methods of rubber heel making. The cured heels fit tightly in the mold cavities, from which it has been customary to remove them by driving out each one separately, after which each heel was finally trimmed, to remove the fin or overflow from its edges. My method does away with removing the cured heels one at a time from the mold cavities, since the heels are connected together in a sheet which can be grasped and stripped from the mold by a single pull. If the rubber compound is applied to the mold in a single piece it also makes it practicable to eliminate the difficult operation of dieing out the biscuits and the insertion of the separate biscuits in the individual mold cavities.

The invention also includes an improvement upon the step product of the molding operation disclosed and claimed in my copending application Ser. No. 69,192, filed Nov. 14, 1925, which I believe to be new in the art and which consists of a plurality of individual, molded, rubber heel or sole bodies connected together by a relatively thin sheet or web of metal. This product is a single piece of material and may be handled as such, despite the fact that it may comprise a considerable number of heel bodies, which it has heretofore been the practice to handle separately. It may be considered as a sheet of connected heel bodies, which may readily be fed to a cutting die by the feeding mechanism of an automatic die cutting machine which is capable of cutting out the individual heels from the sheet much more rapidly than the overflow can be trimmed from separate heels molded by the old method.

It is a fact well known to those skilled in the art that rubber heels shrink materially after they are removed from the mold in which they were vulcanized, and that heels made from different compounds shrink differently, with the result that different heels, even though made in the same mold, may be different in size. In another aspect, the present invention, to overcome this undesirable condition, comprises molding rubber heels somewhat oversize, allowing them to shrink to substantially normal condition, and then cutting or trimming them all to one, uniform, exact size. This process, further, makes possible a large saving in the cost of molds, since the mold cavities need not be uniform and exact in size, as has heretofore been important, and the side walls of the cavities need not be finely finished, since the edge surface formed upon the heel by the mold is not the surface which will appear on the completed heel. The cavity member of the mold may even be a metal casting, which can be made very cheaply and yet be sufficiently accurate for the purpose, whereas until now the cavities have been carefully worked out, as accurately and smoothly as possible, in a steel plate and the cost of the cavity member of the mold has been high. For my purposes it is not important that all the cavities in a given mold be exactly alike, since perfect uniformity of size and shape will result in the heels if they are, after shrinkage, all cut to a size with the same cutting die.

Still another novel characteristic of the method of the present invention, which is especially valuable in the production of rubber heels of the cored type, consists in molding a plurality of individual heel bodies upon a sheet of backing material and pressing into the back of each heel body a portion of the backing sheet, less in area than the heel. Then when the heels are sliced from the backing sheet, each heel will have in its attaching face a core of the backing material which does not extend to the edge of the heel. The slicing step may be carried out in connection with the die cutting above described, and may occur either before or after the die cutting. If the slicing operation is performed first, the separate heels may then be die cut to exact size; if the die cutting is performed first, the heels and those portions of the web which are not desired may be separated by slicing or otherwise.

For convenience, the material of the heel bodies is referred to in the present specification and the appended claims as rubber or rubber compound, but it should be understood that this is only for the purpose of facilitating a clear description of the invention and that it is immaterial to the method whether the material used actually be rubber or some other moldable material suitable for heels.

A typical example of a manner in which the method of my invention may be practised in the manufacture of heels is set forth in the following detailed description in connection with the accompanying drawings, in which:

Fig. 1 is a view, partly in section, of a portion of a mold with material in position, ready for commencing the first step of the process;

Fig. 2 is a view similar to Fig. 1, showing the mold closed upon the work;

Fig. 3 is a view, similar to Fig. 1, showing the use of a single mass of rubber compound instead of separate biscuits;

Fig. 4 is a perspective view of the molded sheet being stripped from the mold;

Fig. 5 is a perspective view of the product of the molding operation, showing a slicing knife in position to operate thereon;

Fig. 6 illustrates the use of a cutting die upon the molded product;

Fig. 7 is a longitudinal, vertical section of the sheet shown in Fig. 4; and

Fig. 8 is a perspective view, partly in section, of one form of the product of the method.

Referring, now, to the drawings, the mold herein illustrated is of the type commonly called a two-part mold, and consists of a cavity section and a face plate. The cavity section comprises a base plate 10 to which is secured a block 12 containing the cavities 14 in which the heel bodies are to be molded. The face plate 16 has secured to it a flange 18, which encloses the block 12 when the mold parts are fitted together, and is high enough to prevent the plate 16 from engaging the top of the block 12.

In practising my novel method of heel manufacture the unvulcanized rubber compound is first formed into a thick sheet, as usual. This sheet may be cut up into pieces, or biscuits 20, as shown in Fig. 1, which may be placed separately in the individual mold cavities; or, as shown in Fig. 3, the sheet of rubber compound may be placed, in a single piece or mass 21, upon the top of the cavity section of the mold. If heels of the washer type are required, the mold cavities will, of course, be provided with the conventional washer supporting pins upon which washers will be placed before the rubber compound is placed.

If heels without cores or backing are desired, the face plate 16 is now applied and the mold, with its contents, is placed in a suitable press where it is subjected to heat and pressure. The compound is thus forced into the mold cavities 14, filling them and producing a plurality of individual heel bodies, connected together by a relatively thin sheet or web of the heel material since the face plate, as supported by the flange 18, is spaced from the top of the cavity section of the mold sufficiently to produce a web, the minimum thickness of which is definitely predetermined.

When it is desired to use backing material, a sheet of fabric, metal, wood, fiber, hard rubber or other thermo-plastic compound, or other material suitable for the purpose, shown at 22, may be placed upon the biscuits or mass of compound before the mold is closed, as illustrated in Figs. 1 and 3. The molding operation will then produce a plurality of individual heel bodies molded upon, and connected together by, a single, integral web or sheet of backing material.

Soft metal, such as sheet aluminum, makes a very satisfactory backing material. It is readily penetrable by heel attaching nails but anchors such nails securely so that no washers are required in the heel, it is readily molded to desired shapes, and is easily cut with a die or knife. It also lends itself conveniently to the production by my method of heels of the cored type, such as the heel shown in Fig. 8, in which the core 24 consists of a piece of backing material. In the production of such heels as this, the face plate 16 has secured to it, concentrically with the mold cavities, a series of formers 26 each of which is smaller in area than the corresponding mold cavity and operates, in the molding operation, to press or indent a portion of the backing sheet, less in area than a heel, into the back of the molded heel body, as clearly shown in Fig. 2.

Whatever the material of the sheet or web by which the individual heel bodies are connected together, the entire sheet of connected heels may be quickly stripped from the mold, after the face plate has been removed, by merely grasping it and exerting a single pull upon it, as shown in Fig. 4, wherein the backing sheet 22 is shown as having an extended tab 28 which may be conveniently seized.

After removal from the mold, the product of the molding operation appears as shown in Fig. 5, where 30 indicates a plurality of individual, molded heel bodies connected together by a relatively thin sheet, which in this case is the backing material 22, with, perhaps, a small amount of rubber 32 upon it. In the back of the sheet the indentations where the backing has been pressed into the heel bodies appear as at 34.

This product of the molding step is a single piece of material, for purposes of handling and transportation and may be stored or shipped in this condition.

In order to complete the heels it is necessary to separate them from the sheet. In the case of other than cored heels made by the particular process illustrated the completion of the heels may be readily accomplished by a cutting die, as indicated in Fig. 6 at 36. The cutting die may be operated by hand or, more rapidly, by an automatic die-cutting machine, the feeding mechanism of which is capable of feeding the sheet of connected heel bodies automatically to the die. In either event the die will be forced entirely through the connecting web and a complete, accurately trimmed heel will be produced at each stroke of the die. If the cutting die 36 is of the same size as the heel body 30 the die will operate upon the connecting web only, and it is within the scope of the invention so to operate. Under some conditions, however, it is advantageous to use a die somewhat smaller than the heel body 30, as shown in Fig. 6, in which event the entire edge surface of the completed heel will be formed by the cutting action of the die.

When a cutting die smaller than the heel body 30 is used for the operation of completing the heels, all the heels will manifestly be identical in size and shape, regardless of their characteristics in this respect when they are in the connected, sheet form illustrated in Fig. 5. It is, therefore, not important that the mold cavities be all uniform and exact in size and shape nor even that their side walls be smoothly finished, the only essential being that the molded heel bodies be somewhat oversize as compared with the completed heels required.

A further advantage in the use of a cutting die arises from the well-known characteristics of shrinkage of freshly vulcanized rubber compounds, which continues for some time after the molded article has been removed from the mold and which is at times so variable that its extent cannot be exactly predicted and allowed for. The result of this shrinkage is that different articles, even though made in the same mold, may not be exactly uniform in size and shape. I am enabled to overcome this undesirable condition by molding the rubber heel bodies somewhat oversize, as above described, allowing them to shrink to substantially normal condition, and then cutting or trimming them all to one, uniform, exact size. This may be effectively accomplished by merely allowing the molded sheets of connected heel bodies to lie until shrinkage has progressed sufficiently, between the molding and die cutting steps of the process.

When a cored heel, such as that shown in Fig. 8, is to be made by my method, the backing material 22 may be pressed into the backs of the heel bodies in the molding operation, as has already been described and illustrated, and the heel bodies may then be sliced from the waste portion of the connecting web and backing sheet by any suitable means such, for example, as a knife 38 operating to cut along the surface of the connecting web in a plane substantially parallel to the web. The nature of this operation will be sufficiently apparent from an inspection of Figs. 5 and 7 and the back face of each heel after it is sliced from the sheet will appear as shown in Fig. 8. If the accuracy and finish of the mold cavities and the action of the rubber compound are such that the edge surfaces of the heel bodies are sufficiently perfect to meet requirements, the heels may be considered as completed by the slicing operation.

In order, however, to secure all the benefits possible from the method, it may be desired to perform both the slicing and die cutting steps and these two steps may be carried out in either order desired. If the slicing operation is performed first, the separate heels may then be die cut to exact size; if the die cutting is performed first, the heels may thereafter be sliced or otherwise freed from those portions of the sheet of backing material to which they are still attached and which it may be desired to remove in order that the said backing material shall not show at the edge of the completed heel.

It will be apparent from the foregoing description that my improvd method of making rubber treads effects substantial economies in the manufacturing cost from the viewpoint of labor, production speed, and machinery cost, as compared with methods heretofore used, and is adaptable to the production of treads which are more nearly perfect in respect to uniformity in size and shape than is the rule at the present time. It is, furthermore, to be understood that such modifications, within the scope of the appended claims, as would naturally occur to those skilled in the art are within the scope of the invention and that the specific description of details in the performance of the various steps of the method which has been given is merely illustrative.

Having described my invention, what I claim as new and desire to secure by Letters Patent of the United States is:—

1. A step product consisting of a sheet of heel backing material having a plurality of individual rubber heel bodies molded thereon, said backing material being indented into the back of each heel body over an area less than that of said heel body.

2. A step product consisting of a sheet of metal penetrable by nails and having secured to one of its faces a plurality of individual, molded, rubber heel bodies.

3. The method of making rubber heels subject to shrinkage after molding which comprises molding and vulcanizing individual heels somewhat oversize, allowing the heels to shrink to substantially normal condition after they are molded and vulcanized, and then cutting the shrunken heels all to one uniform, exact size.

4. The method of making rubber heels uniform in size which comprises molding and vulcanizing individual heels somewhat oversize without regard to exact uniformity, and then cutting the molded and vulcanized heels all to one uniform, exact size.

5. The method of making rubber heels uniform in size which comprises molding and vulcanizing individual heels somewhat oversize without regard to exact uniformity, allowing the heels to shrink to substantially normal condition after they are molded and vulcanized, and then cutting the shrunken heels all to one uniform, exact size with the same cutting die.

6. The method of making rubber heels which comprises molding a plurality of individual heel bodies connected together by a relatively thin web of material, and then slicing the heel bodies from the surface of the web.

7. The method of making rubber heels which comprises molding a plurality of individual heel bodies connected together by a relatively thin web of material, and then separating the heel bodies from the web by cutting in a plane substantially parallel to the web.

8. The method of making cored rubber heels which comprises molding a plurality of individual heel bodies upon a sheet of backing material, pressing into the back of each heel body a portion of the backing material less in area than said heel body, and slicing the heel bodies, with the pressed-in portions of the backing sheet, from the remainder of the backing sheet.

9. The method of making cored rubber heels which consists in molding a plurality of individual heel bodies upon a sheet of backing material, pressing into the back of each heel body a portion of the backing material less in area than said heel body, slicing the heel bodies, with the pressed-in portions of the backing sheet, from the remainder of the backing sheet, and die cutting the heel bodies to the required size and shape.

In testimony whereof I have signed my name to this specification.

CLIFFORD ROBERTS.